(12) United States Patent
Kim

(10) Patent No.: US 10,901,206 B2
(45) Date of Patent: Jan. 26, 2021

(54) HMD DEVICE FOR COMMON USE AND GAME MACHINE HAVING SAME

(71) Applicant: TOVIS CO., LTD., Incheon (KR)

(72) Inventor: Yong Beom Kim, Incheon (KR)

(73) Assignee: TOVIS CO., LTD., Incheon (KR)

(*) Notice: Subject to any disclaimer, the term of this patent is extended or adjusted under 35 U.S.C. 154(b) by 188 days.

(21) Appl. No.: 16/304,124

(22) PCT Filed: May 11, 2017

(86) PCT No.: PCT/KR2017/004864
§ 371 (c)(1),
(2) Date: Nov. 21, 2018

(87) PCT Pub. No.: WO2017/204478
PCT Pub. Date: Nov. 30, 2017

(65) Prior Publication Data
US 2020/0326535 A1    Oct. 15, 2020

(30) Foreign Application Priority Data
May 23, 2016 (KR) .................. 10-2016-0063042

(51) Int. Cl.
G02B 27/01 (2006.01)
G02B 27/00 (2006.01)
A63F 13/53 (2014.01)

(52) U.S. Cl.
CPC .......... G02B 27/0093 (2013.01); A63F 13/53 (2014.09); G02B 27/0101 (2013.01);
(Continued)

(58) Field of Classification Search
None
See application file for complete search history.

(56) References Cited

U.S. PATENT DOCUMENTS

2002/0180659 A1* 12/2002 Takahashi ............. G02B 30/25
345/4
2005/0007445 A1* 1/2005 Foote .................... H04N 7/142
348/14.08
(Continued)

FOREIGN PATENT DOCUMENTS

JP    2002-290991 A    10/2002
JP    2014-011654 A    1/2014
(Continued)

OTHER PUBLICATIONS

Machine translation of KR 2013-0023465 (Year: 2013).*
International Search Report for PCT/KR2017/004864 dated Jun. 15, 2017 from Korean Intellectual Property Office.

*Primary Examiner* — Dorothy Harris
(74) *Attorney, Agent, or Firm* — Revolution IP, PLLC

(57) ABSTRACT

A head-mounted display (HMD) device includes: an HMD unit comprising a display panel configured to display an image and at least one lens for viewing the image on the display panel at a close distance; a distance-sensing sensor provided on the HMD unit to sense a distance between a user and the HMD unit to make the HMD unit be spaced apart from the user by a preset distance and avoid contact with the user; and a unit movement mechanism configured to position the HMD unit in front of the eyes of the user based on information sensed by the distance-sensing sensor to make the HMD unit avoid contact with the user.

7 Claims, 6 Drawing Sheets

(52) U.S. Cl.
CPC ..... *G02B 27/0172* (2013.01); *G02B 27/0176* (2013.01); *G02B 27/0179* (2013.01); *A63F 2300/8082* (2013.01); *G02B 2027/0138* (2013.01); *G02B 2027/0187* (2013.01)

(56) References Cited

U.S. PATENT DOCUMENTS

| | | | |
|---|---|---|---|
| 2005/0068294 A1* | 3/2005 | Cheng | G06F 3/011 345/161 |
| 2006/0119572 A1* | 6/2006 | Lanier | G06F 1/1605 345/156 |
| 2008/0055730 A1* | 3/2008 | Lin | G02B 27/0093 359/602 |
| 2010/0061509 A1* | 3/2010 | D'Ambrosio | A61B 6/4458 378/62 |
| 2015/0189266 A1* | 7/2015 | Zhou | H04N 13/128 348/54 |

FOREIGN PATENT DOCUMENTS

| | | |
|---|---|---|
| KR | 10-0861813 B1 | 10/2008 |
| KR | 10-2008-0098464 A | 11/2008 |
| KR | 10-2013-0023465 A | 3/2013 |
| KR | 20130023465 A * | 3/2013 |

* cited by examiner

[FIG.1]
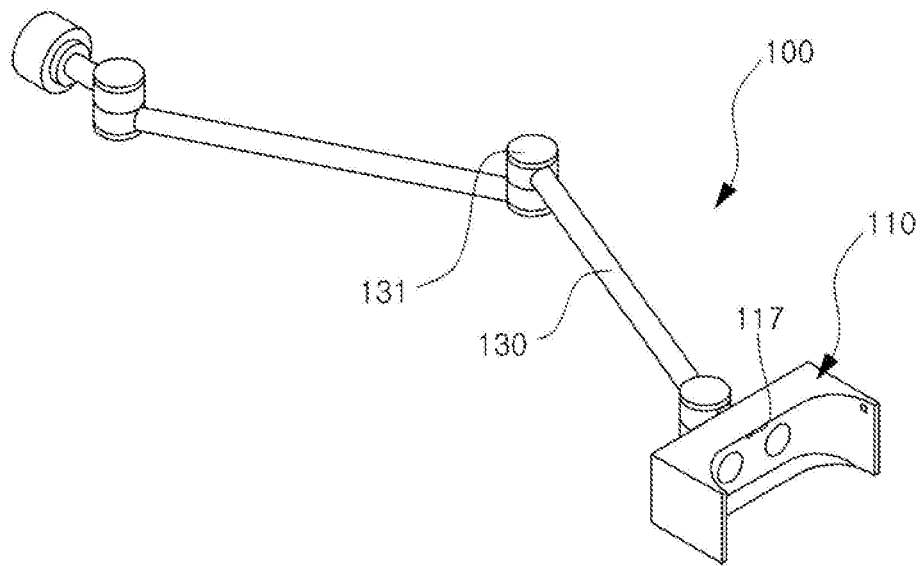

[FIG.2]
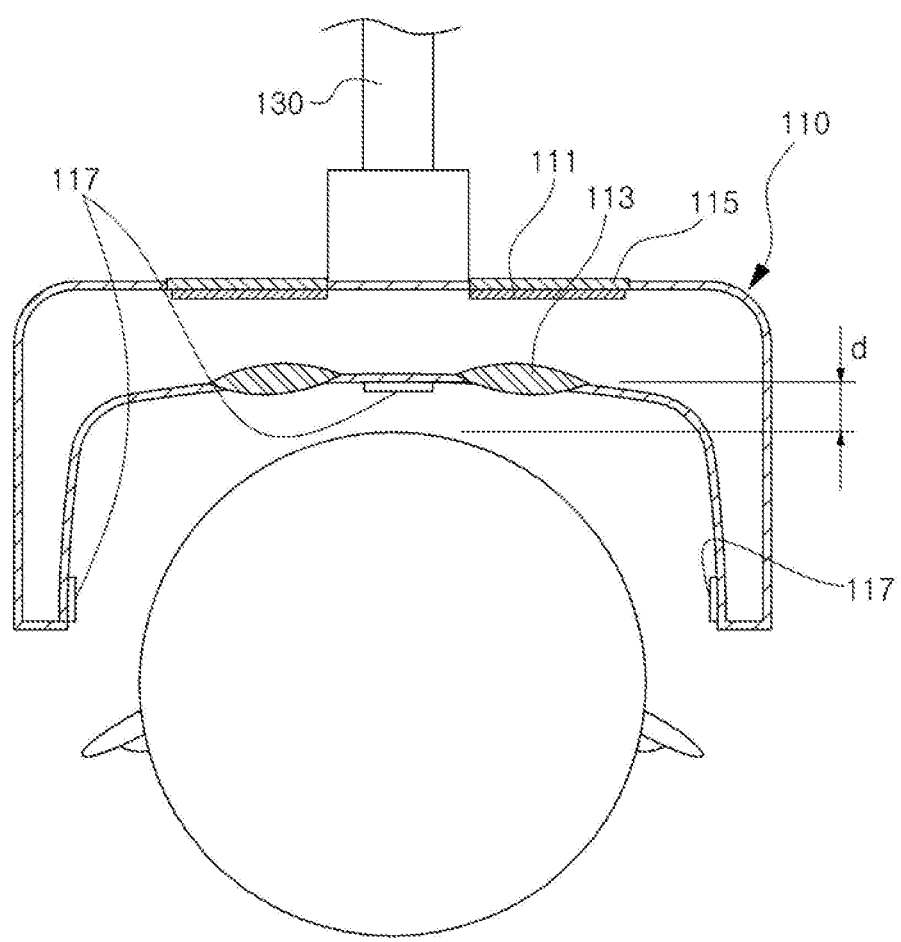

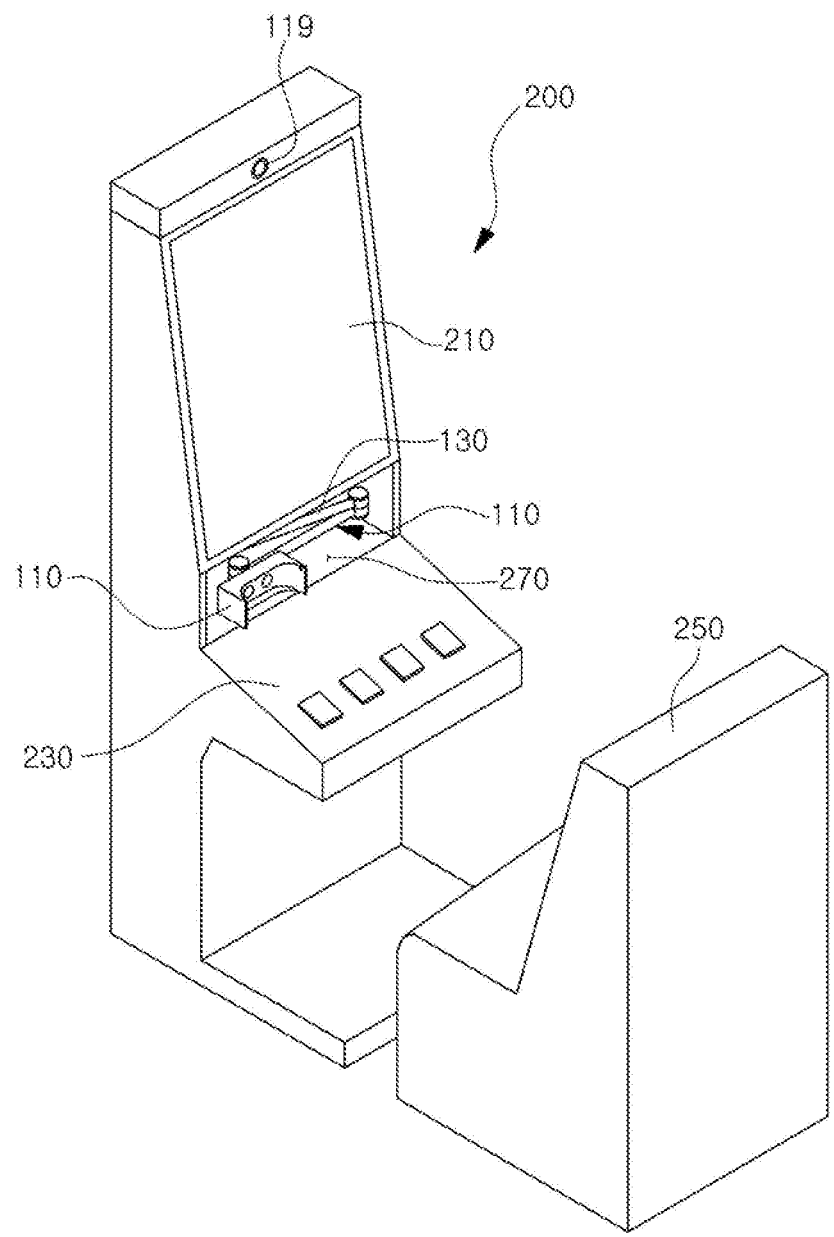
[FIG.3]

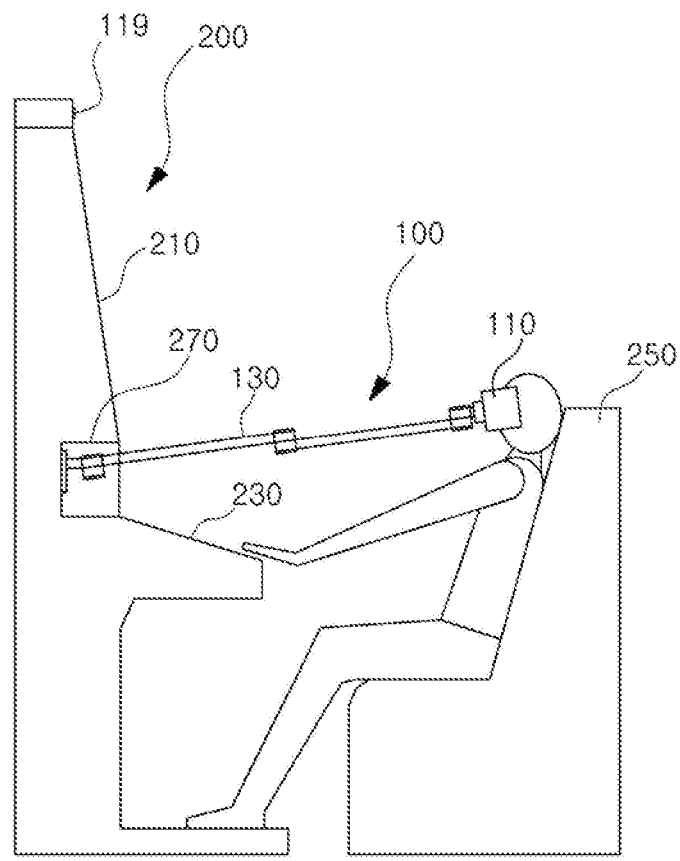
[FIG.4]

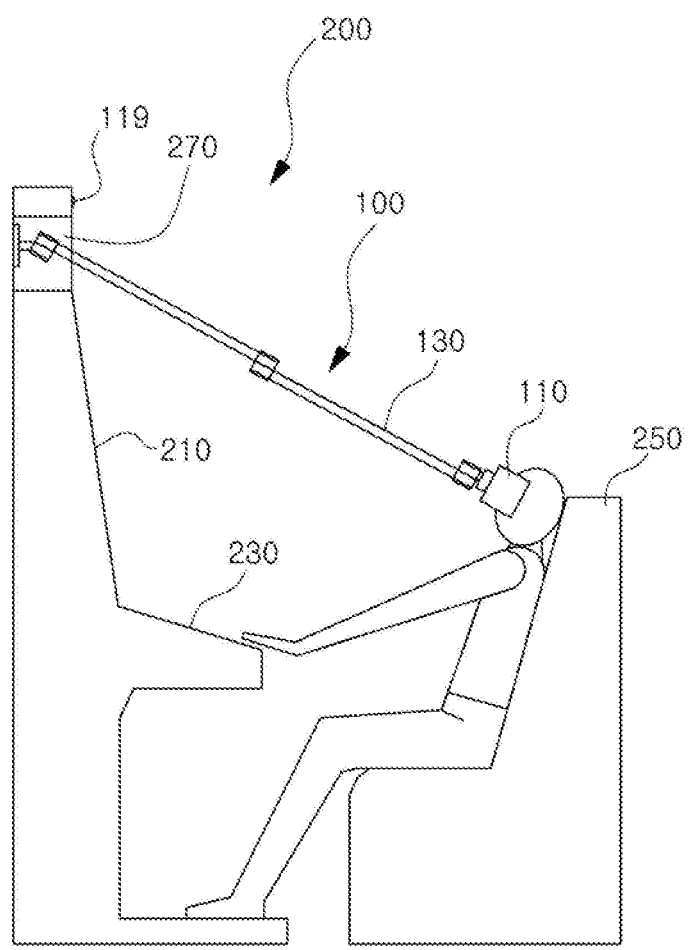
[FIG.5]

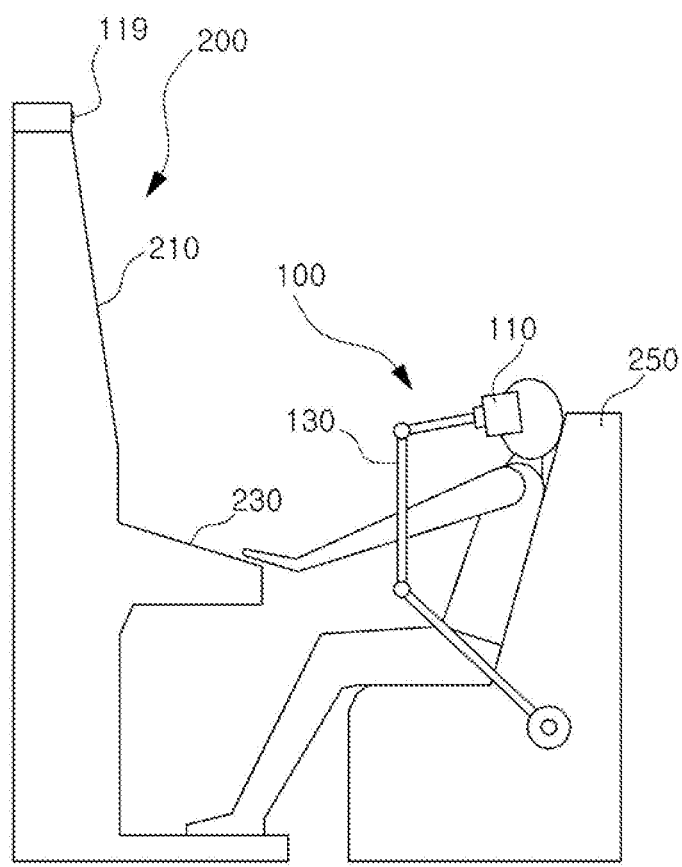
[FIG.6]

HMD DEVICE FOR COMMON USE AND GAME MACHINE HAVING SAME

TECHNICAL FIELD

The present invention relates to an HMD device which enables many people to use an HMD for the implementation of virtual reality (VR) without any inconvenience and a game machine having the same.

BACKGROUND ART

In general, as VR experience equipment, there is a head-mounted display (HMD), in which a lens in front of the user's eyes and a display disposed at a focal distance from the lens (in other words, a lens provided to assist the user's eyes in viewing a display close thereto) are manufactured as a single unit (package). Such an HMD is worn on the head of a user or is brought into close contact with the head using a band when in use.

The HMD is a very personal device. When attempting to use an HMD for common use, it may be different from person to person, but some people may feel uncomfortable due to the fact that he or she again uses the HMD, which was closely attached to the body of another person, in close contact with his/her body. Actually, an HMD that comes into contact with many people may have a hygiene problem. In addition, the HMD may be easily damaged in the course of being closely attached to and detached from the bodies of multiple people, a person who wears glasses needs to remove his/her glasses when using the HMD according to the structure of the HMD, and the HMD is uncomfortable to wear for a long time due to, for example, the pain caused when a mounting headband is tightened on the head due to the weight and structure of the HMD.

PRIOR ART DOCUMENT

Patent Document

Korean Patent Registration No. 10-0861813 (registered on Sep. 29, 2008)

DISCLOSURE

Technical Problem

The present invention has been made in view of the above problems, and it is an object of the present invention to provide an HMD device for common use, which enables many people to experience virtual reality (VR) using the same HMD device for the purpose of common use and may solve, for example, the problem of unhygienic use of the HMD device, which is caused when the HMD device is for common use, and user displeasure due thereto, inconvenience to a person who wears glasses since the person needs to remove his/her glasses when using the HMD device according to the structure of the HMD device, and damage due to frequent attachment and detachment of the HMD device to and from many people.

Technical Solution

In accordance with one aspect of the present invention, the above and other objects can be accomplished by the provision of a head-mounted display (HMD) device for common use to be used in common by many people, the HMD device including an HMD unit including a display panel configured to display an image and at least one lens for viewing the image on the display panel at a close distance, a distance-sensing sensor provided on the HMD unit to sense a distance between a user and the HMD unit to make the HMD unit be spaced apart from the user by a preset distance and avoid contact with the user, and a unit movement mechanism configured to position the HMD unit in front of the eyes of the user based on information sensed by the distance-sensing sensor to make the HMD unit avoid contact with the user.

The unit movement mechanism may include an articulated arm including at least one joint so as to be folded or unfolded by a servo motor.

The HMD device for common use may further include a camera configured to capture an image of the user to make the unit movement mechanism be positioned in front of the eyes of the user, and the unit movement mechanism may position the HMD unit in front of the eyes of the user based on the image of the user captured by the camera.

The distance-sensing sensor may be provided on one or both of a center and either end of a portion of the HMD unit that faces the user.

The distance-sensing sensor may include a sensor configured to sense the face or shape of the user so as to allow the HMD unit to move according to movement of the user.

The HMD unit may be configured to allow a game image displayed on a game image display member to be viewed through the HMD unit, and the HMD device may further include an optical shutter provided on a front of the HMD unit to block or open a field of vision.

In accordance with another aspect of the present invention, there is provided a game machine including the HMD device for common use according to the above-described aspect, the game machine further including a game machine body provided with the HMD device for common use, the game image display member provided in an upper portion of the game machine body to display a game image, and a game control member located under the game image display member to play a game, wherein the HMD device for common use is operated when an event occurs in a game to provide an image related to the event.

The game machine body may include an accommodating portion formed in a portion thereof for accommodating therein the HMD device for common use.

Advantageous Effects

According to the present invention, since an HMD unit is configured so as not to be brought into contact with the body of a user, it is possible to prevent hygiene problems, physical pressure and pain caused when the user wears the HMD unit for a long time, inconvenience to a user who needs to remove his/her glasses, and damage to the HMD unit due to frequent attachment and detachment thereof.

In addition, when an HMD device for common use is applied to a game machine, it is possible to improve the effects derived from an event that occurs in a game.

DESCRIPTION OF DRAWINGS

FIG. 1 is a perspective view illustrating an HMD device for common use according to an embodiment of the present invention.

FIG. 2 is a schematic cross-sectional view of an HMD unit of the HMD device for common use according to the embodiment of the present invention.

FIG. 3 is a perspective view illustrating a game machine including the HMD device for common use according to the embodiment of the present invention.

FIG. 4 is a side view illustrating the game machine including the HMD device for common use according to the embodiment of the present invention.

FIG. 5 is a side view illustrating the game machine including the HMD device for common use according to the embodiment of the present invention, which includes an accommodating portion formed in an upper portion thereof.

FIG. 6 is a side view of the game machine including the HMD device for common use according to the embodiment of the present invention, illustrating the state in which a unit movement mechanism is provided on a seat.

BEST MODE

Hereinafter, embodiments of the present invention will be described with reference to the accompanying drawings.

An HMD device for common use 100 according to the present invention is manufactured for the purpose of common use to experience virtual reality (VR). The HMD device for common use may be installed in a place where many and unspecified persons may frequently use the HMD device, such as a museum, an exhibit hall, a theater, or a game room.

As illustrated in FIGS. 1 and 2, the HMD device for common use 100 according to the present invention may include a head-mounted display (HMD) unit 110.

The HMD unit 110 may show a VR image to enable the experience of virtual reality (VR).

The HMD unit 110 may include a display panel 111 that displays an image. The HMD unit 110 may be provided with an optical system, which includes at least one lens 113 so as to allow a user to view the image displayed on the display panel 111 at a close distance.

Here, the HMD unit 110 may be configured to cause the two eyes of the user to view different images, so that the user experiences VR including a three-dimensional image. In the embodiment, the HMD unit 110 is configured as an enclosed type in which a view of the outside is not seen, but may be of a see-through type, in which the image displayed on the display panel 111 and a view of the outside are seen in a combined manner.

In addition, the HMD unit 110 may be realized as any one of known various types of VR appliances. The display panel 111 may be a panel such as an LCD, PDP, LCOS, or OLED panel, and may also be a transparent panel capable of displaying an image.

When the HMD unit 110 is of a see-through type, an optical shutter 115 that optically blocks light or opens the HMD unit may be provided on the front of the HMD unit 110 so as to selectively block light. As such, the HMD unit may be configured as an enclosed type, or may be configured as a see-through type so as to be opened for the introduction of light.

Here, the optical shutter 115 may be realized as a switching panel that is selectively switchable between a transparent state and an opaque state, such as a PDLC, PSCT, or E-ink panel.

Meanwhile, in the HMD unit 110, a rim portion thereof for viewing an image may be formed in a rounded shape to cover a region from the periphery of the user's eyes to the lateral side of the eyes so as to prevent the user from viewing the outside.

As illustrated in FIGS. 1 and 2, the HMD device for common use 100 according to the present invention may include a distance-sensing sensor 117.

The distance-sensing sensor 117 may be coupled to the HMD unit 110 to sense the distance between the user and the HMD unit 110 so that the HMD unit 110 is spaced apart from the user by a predetermined distance d (approximately 1-10 cm), rather than being brought into close contact with the user.

Here, since the HMD device for common use 100 is used by many people due to the characteristics thereof, various hygiene problems may occur when the HMD device comes into contact with the user's body. Therefore, the distance-sensing sensor 117 may measure or sense a preset distance between the HMD unit 110 and the user.

To this end, the distance-sensing sensor 117 may be realized as a camera, an IR sensor, a laser sensor, or an ultrasonic sensor.

The distance-sensing sensor 117 may be provided on a portion of the HMD unit 110 that faces the user. Specifically, the distance-sensing sensor 117 may be provided on each of a central portion and both ends of the HMD unit 110, which face the user, to sense the distance from the user, in order to prevent any peripheral location of the HMD unit 110 from coming into contact with the body of the user.

For example, when the distance-sensing sensor 117 is provided only on the central portion, the distance-sensing sensor 117 may cause only the central portion of the HMD unit 110 to be spaced apart from the user, and therefore there is the risk of both ends of the HMD unit 110 coming into contact with the body of the user. For this reason, in the present invention, the distance-sensing sensor 117 is provided not only on the central portion of the HMD unit 110 but also on either end of the HMD unit in order to prevent any location of the HMD unit 110 from coming into contact with the body of the user.

Meanwhile, information sensed by the distance-sensing sensor 117 may be provided to a position-tracking element of a controller that controls a unit movement mechanism 130, which will be described below, and the controller controls the unit movement mechanism 130 in real time based on the provided information, whereby the HMD unit 110 may be maintained at a predetermined distance from the user so as not to come into contact with the body of the user.

In addition, the distance-sensing sensor 117 may include a sensor capable of sensing the face or the body of the user so as to allow the HMD unit 110 to move according to the movement of the user, and the sensor may be realized as a camera 119.

For example, the camera 119 may capture an image of the user, and may sense the face or the body of the user based on the captured image.

Meanwhile, the camera 119 may provide the captured image of the user to the position-tracking element of the controller, and the position-tracking element may track the position of a specific portion of the face, for example, the eyes or the nose based on the captured image of the user, so that the unit movement mechanism 130 may accurately position the HMD unit 110 in front of the eyes of the user based on the tracked information.

In addition, the camera 119 may grasp the shape of the user or the face of the user in real time by capturing an image of the user, and may track the grasped shape or face in real time so as to provide the tracked information to the controller of the unit movement mechanism 130 so as to allow the HMD unit 110 to move according to the movement of the user.

As illustrated in FIGS. 1 and 2, the HMD device for common use 100 according to the embodiment of the present invention may include the unit movement mechanism 130.

The unit movement mechanism 130 may be coupled to the HMD unit 110 to move the HMD unit 110 in front of the eyes of the user.

Meanwhile, the unit movement mechanism 130 may be realized as an articulated arm, which includes at least one joint 131 configured to be rotated by a servo motor so as enable the folding and unfolding of the articulated arm.

In the embodiment, the unit movement mechanism 130 may be realized as an articulated arm having three joints 131 so as to be folded or unfolded about the joints 131 in order to position the HMD unit 110 in front of the eyes of the user. A portion of the articulated arm, to which the HMD unit 110 is coupled, may be provided with a 3-way control motor, which is capable of driving the HMD unit in three directions, i.e. in the front-and-rear direction, the left-and-right direction, and the vertical direction, so that the articulated arm is capable of precisely setting the position of the HMD unit 110.

Meanwhile, the unit movement mechanism 130 may control the servo motor of each joint 131 using the image provided from the camera 119 to the position-tracking element of the controller and the information sensed by the distance-sensing sensor 117, thereby positioning the HMD unit 110 in front of the eyes of the user so as not to come into contact with the user.

Here, to enable the movement of the HMD unit 110, the position-tracking element may control the 3-way control motor of the articulated arm, which is coupled to the HMD unit 110, when it is desired to precisely move the HMD unit 110, and may control the servo motor of each joint 131 when it is desired to move the HMD unit beyond the movement distance of the 3-way control motor.

Meanwhile, in the embodiment, the unit movement mechanism 130 is illustrated as being provided on a game machine body located in front of the user, but may be provided on a seat 250 on which the user sits, or may be provided on any other structure located at a place where the HMD unit 110 is to be provided to the user.

The HMD device for common use 100 according to the embodiment of the present invention may include a contact-sensing sensor.

When the user who experiences VR using the HMD unit 110 grips the HMD unit 110 or the unit movement mechanism 130 with his/her hand, the contact-sensing sensor may warn the user in order to prevent damage to the unit movement mechanism 110.

The contact-sensing sensor (not illustrated) may be realized as an electromagnetic sensor, a pressure sensor, or the like. When a signal in response to contact is generated from the contact-sensing sensor, the controller may visually warn the user using an image on the HMD device 100, or may issue an audible warning using a speaker.

In the HMD device for common use 100 according to the present embodiment having the above-described configuration, when an event occurs in a game or when it is desired to show a VR image to the user, the camera 119 may capture an image of the user to grasp the position of the user from the captured image. When the user is located at a distance at which the HMD unit 110 may be provided to the user, the position-tracking element of the controller tracks a specific face portion of the user based on the image captured by the camera 119.

Then, when the specific face portion of the user is tracked by the position-tracking element, the unit movement mechanism 130 is operated to position the HMD unit 110 in front of the eyes of the user, so that the user experiences VR using the HMD unit 110.

At this time, the position-tracking element sets the position of the HMD unit 110 in real time based on the information sensed by the distance-sensing sensor 117 so that the HMD unit 110 is spaced apart from the user by a preset distance. This makes it possible to prevent the HMD unit 110 from coming into contact with the body of the user, which prevents hygiene problems.

In addition, when the experience of VR using the HMD unit 110 is terminated, the controller controls the unit movement mechanism 130 so as to return the HMD unit 110 to the initial position thereof.

In this way, by maintaining the HMD unit 110, which is used by many people, so as not to come into contact with the body of the user, the HMD device for common use 100 according to the embodiment of the present invention may prevent not only hygiene problems but also physical pressure and pain caused when the user wears the HMD unit 110 for a long time, and may also prevent inconvenience to a user who needs to remove his/her glasses and damage to the HMD unit 110 due to frequent attachment and detachment thereof.

Hereinafter, a game machine 200 including the HMD device for common use 100 according to the embodiment of the present invention will be described.

As illustrated in FIGS. 3 and 4, the game machine 200 including the HMD device for common use 100 according to the embodiment of the present invention may include a game machine body.

The game machine body may execute a game and may display a game to be played. To this end, the game machine body may include a game image display member 210.

The game image display member 210 may be realized as a display panel that displays an image, or may be configured by overlapping several display panels so as to exert the three-dimensional effects of an image. Alternatively, by coupling a display panel to a different type of display device, the game image display member may be configured to realize various three-dimensional effects of an image.

The display panel may be realized as an OLED, LCD, or PDP panel, for example, and may also be realized as a transparent display panel.

In addition, the game machine body may include a game control member 230.

The game control member 230 may generate a control signal for playing a game based on a game image displayed on the game image display member 210.

The game control member 230 may be located under the game image display member 210, and may be realized as a button, a joystick, a touch panel, or the like, which generates a control signal.

In addition, the game machine body may be provided with the camera 119, which senses the eyes of the user who plays a game. The camera may be provided above the game image display member 210.

In addition, the game machine body may be formed with an accommodating portion 270, in which the unit movement mechanism 130 coupled to the HMD unit 110 is accommodated in the folded state. The accommodating portion may be provided above or under the game image display member 210 (see FIGS. 4 and 5).

Meanwhile, the seat 250, on which the user sits, may be provided in front of the game machine body. As illustrated in FIG. 6, the unit movement mechanism 130 may be provided on the seat 250, rather than on the front surface of the game machine body.

The game machine 200 including the HMD device for common use 100 according to the embodiment of the present invention having the above-described configuration executes a game in a manner such that the user who sits on the seat 250 controls the game control member 230 while viewing a game image displayed on the game image display member 210.

Meanwhile, when an event occurs in a game while the user is playing a game, the camera 119 provided on the game machine body captures an image of the user and provides the captured image to the position-tracking element of the controller.

Then, the position-tracking element grasps the eyes of the user from the captured image, and moves the unit movement mechanism 130 towards the face of the user so as to position the HMD unit 110 in front of the eyes of the user, so that the user experiences VR related to the event using the HMD unit 110.

At this time, the HMD unit 110 may provide an event image in the state in which the HMD unit 110 is not in contact with the body of the user based on the information sensed by the distance-sensing sensor 117.

Accordingly, the game machine 200 including the HMD unit for common use according to the embodiment of the present invention may provide an event image via the HMD unit 110, unlike the image displayed on the game image display member 210, which may improve the effects of an event in a game.

In addition, by maintaining the HMD unit 110, which is used by many people, so as not to come into contact with the body of the user, it is possible to prevent hygiene problems, physical pressure and pain caused when the user wears the HMD unit 110 for a long time, inconvenience to a user who needs to remove his/her glasses, and damage to the HMD unit 110 due to frequent attachment and detachment thereof.

Although the embodiments of the present invention have been disclosed for illustrative purposes, those skilled in the art will appreciate that the scope of the present invention is not limited thereto, and various modifications, additions and substitutions are possible, without departing from the scope and spirit of the invention as disclosed in the accompanying claims.

[Description of Reference Numerals]

| | |
|---|---|
| 100: HMD device for common use | 110: HMD unit |
| 111: display panel | 113: lens |
| 115: optical shutter | 117: distance-sensing sensor |
| 119: camera | 130: unit movement mechanism |
| 131: joint | 200: game machine including HMD device for common use |
| 210: game image display member | 230: game control member |
| 250: seat | 270: accommodating portion |

INDUSTRIAL APPLICABILITY

The present invention is applicable to various industrial fields related to three-dimensional images, such as an image industry field, a game industry field, a medical industry field, and a simulation industry field.

The invention claimed is:

1. A head-mounted display (HMD) device for common use to be used in common by many people, the HMD device comprising:
   an HMD unit comprising a display panel configured to display an image and at least one lens for viewing the image on the display panel at a close distance;
   a distance-sensing sensor provided on the HMD unit to sense a distance between a user and the HMD unit to make the HMD unit be spaced apart from the user by a preset distance and avoid contact with the user;
   a unit movement mechanism configured to position the HMD unit in front of the eyes of the user based on information sensed by the distance-sensing sensor to make the HMD unit avoid contact with the user;
   a camera configured to capture an image of the user to make the unit movement mechanism be positioned in front of the eyes of the user,
   wherein the unit movement mechanism positions the HMD unit in front of the eyes of the user based on the image of the user captured by the camera; and
   a contact-sensing sensor for detecting contact with the HMD unit or the unit moving mechanism to warn the user to prevent damage when contacting the HMD unit or the unit moving mechanism.

2. The HMD device for common use according to claim 1, wherein the unit movement mechanism comprises an articulated arm comprising at least one joint so as to be folded or unfolded by a servo motor.

3. The HMD device for common use according to claim 1, wherein the distance-sensing sensor is provided on one or both of a center and either end of a portion of the HMD unit that faces the user.

4. The HMD device for common use according to claim 1, wherein the distance-sensing sensor comprises a sensor configured to sense the face or shape of the user so as to allow the HMD unit to move according to movement of the user.

5. The HMD device for common use according to claim 1, wherein the HMD unit is configured to allow a game image displayed on a game image display member to be viewed through the HMD unit, and
   wherein the HMD device further comprises an optical shutter provided on a front of the HMD unit to block or open a field of vision.

6. A game machine comprising the HMD device for common use according to claim 1, the game machine further comprising:
   a game machine body provided with the HMD device for common use;
   the game image display member provided in an upper portion of the game machine body to display a game image; and
   a game control member located under the game image display member to play a game,
   wherein the HMD device for common use is operated when an event occurs in a game to provide an image related to the event.

7. The game machine according to claim 6, wherein the game machine body comprises an accommodating portion formed in a portion thereof for accommodating therein the HMD device for common use.

* * * * *